L. T. HULBERT.
Gauge Cock.

No. 122,766. Patented Jan. 16, 1872.

Witnesses.
J. H. Burridge
J. Holmes

Inventor.
L. T. Hulbert

UNITED STATES PATENT OFFICE.

L. T. HULBERT, OF PAINESVILLE, OHIO.

IMPROVEMENT IN GAUGE-COCKS.

Specification forming part of Letters Patent No. 122,766, dated January 16, 1872.

*To all whom it may concern:*

Be it known that I, L. T. HULBERT, of Painesville, in the county of Lake and State of Ohio, have invented certain new and useful Improvements in Steam and Water Gauge-Cock; and I do hereby declare that the following is a full and complete description of the same, reference being had to the accompanying drawings making a part of this specification, in which—

Figure 1:
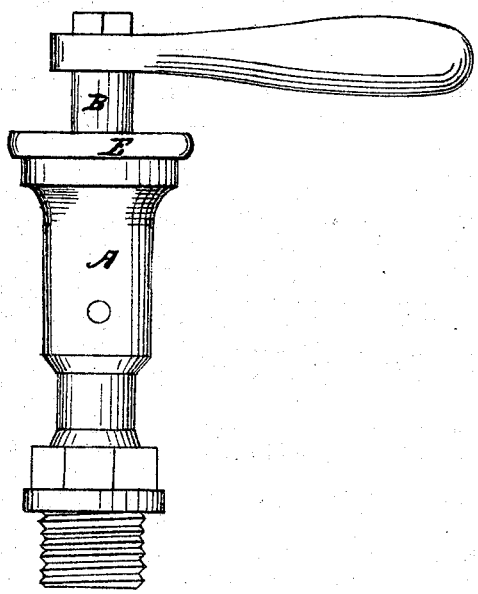
Figure 2:
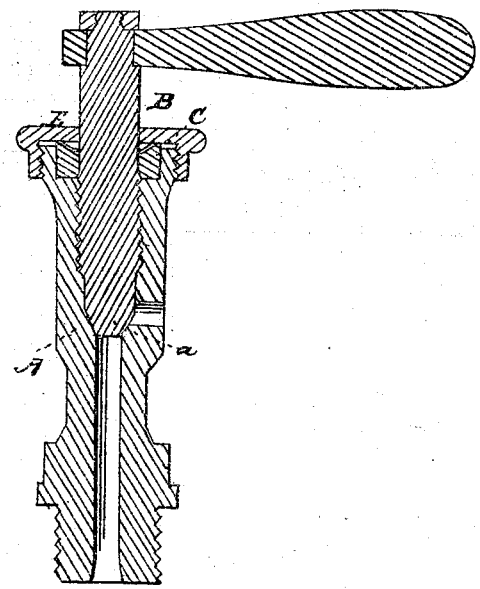
Figure 3:
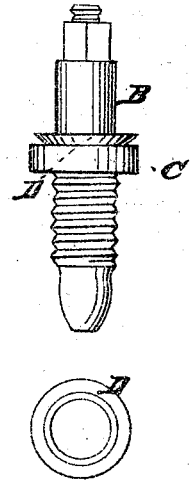

Figure 1 is a perspective view of the cock. Fig. 2 is a vertical section. Fig. 3 is a detached section.

Like letters of reference refer to like parts in the views.

In Fig. 1, A represents the chamber of the cock, in which is fitted the key B, Fig. 3, by screwing the same into the chamber, as shown in Fig. 2. C, Fig. 3, is an elastic collar or gasket surrounding the key and fitted to the inside of the chamber, as shown in Fig. 2. D, Fig. 3, is a dishing metallic washer placed above and upon the gasket, as shown in Fig. 2. This washer is a little less in diameter than the packing or gasket, so that when in place it will not touch the walls of the chamber. This kind of cock as ordinarily made is not provided with a washer and gasket, the consequence of which is that on turning the key the water, steam, &c., will pass around the screw and escape from the chamber through the cup E immediately surrounding the key; and more especially is this the case if there is much pressure, as the key is not screwed tightly in the chamber, but loosely, so as to allow the point $a$ to adjust itself to its seat, and thereby effectually close the cock. This leakage is prevented by the introduction of the gasket and washer, which will, on screwing down the cup E, expand and close tightly around the stem or key by being pressed upon by the washer D, which, being dishing and of less diameter, will by compression spread laterally and act as a spring upon the packing, keeping it at all times closely pressed around the key, and thereby prevent leaking.

What I claim as my improvement, and desire to secure by Letters Patent, is—

The gauge-cock, in which are combined the chamber A, the key B with its valve-point $a$, the spring concavo-convex washer D, with its convex side resting upon the gasket C, by means of which, while the gasket is pressed out from its center, the disk is pressed to duty at its periphery and expanded, all as and for the purpose set forth.

L. T. HULBERT.

Witnesses:
W. H. BURRIDGE,
J. HOLMES.

(148)